United States Patent Office 3,013,679
Patented Dec. 19, 1961

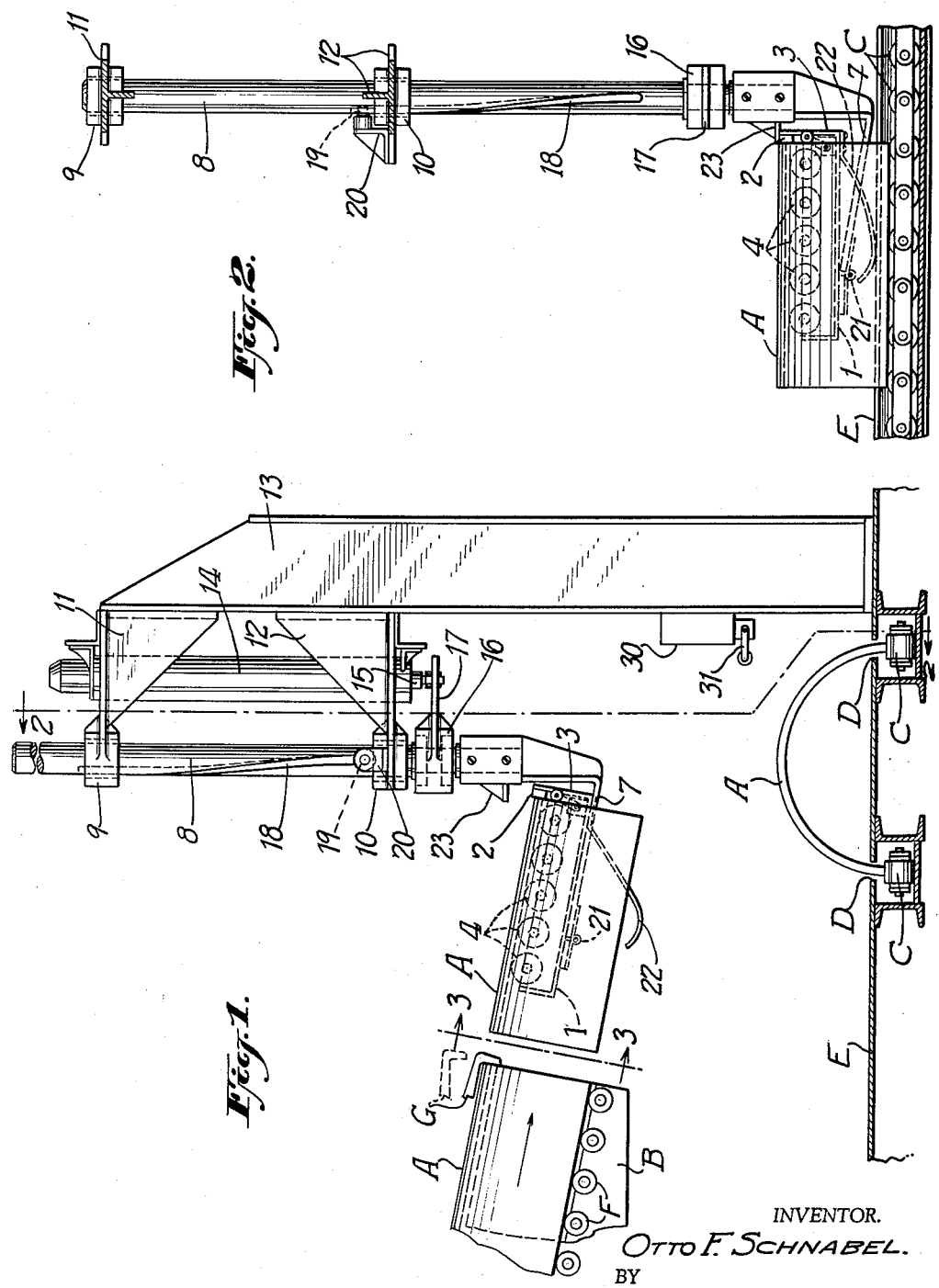

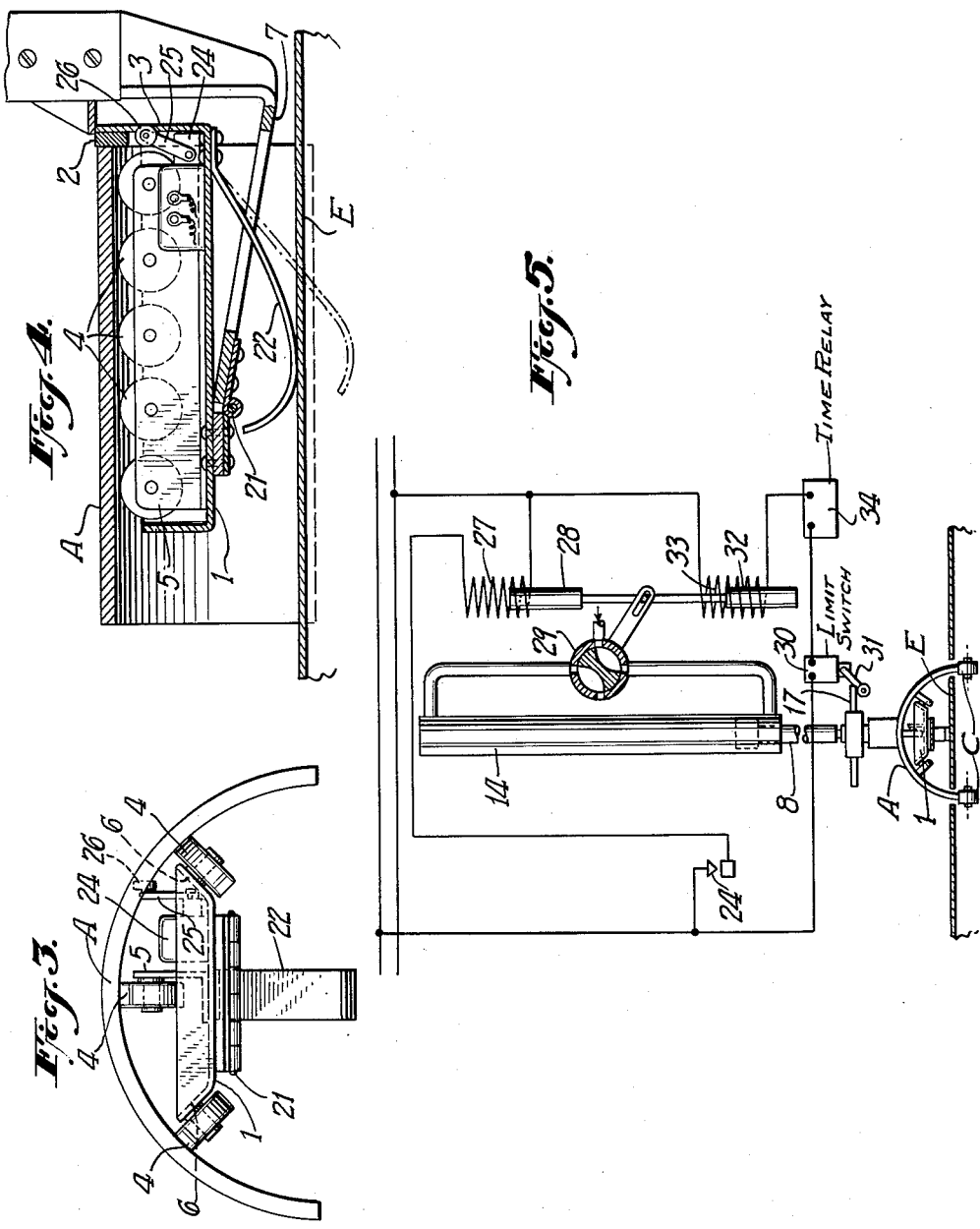

3,013,679
AUTOMATIC WORK TRANSFER MECHANISM
Otto F. Schnabel, Bayside, N.Y., assignor to Gifford-Wood Co., Hudson, N.Y., a corporation of New York
Filed Nov. 3, 1958, Ser. No. 771,476
2 Claims. (Cl. 214—89)

The invention aims to provide a transfer mechanism which will operate automatically to receive work pieces such as stereoplates fed to the mechanism at timed intervals at one level, and which the mechanism thereupon transfers successively to and delivers upon a traveling conveyor which is located at a lower level and usually directed at an angle to the line of feed of the work pieces to the mechanism. Preferably the mechanism is so arranged that movement of a work piece to fully supported position on the mechanism, activates the latter to move the work piece from receiving to delivering position, whereupon the conveyor moves the delivered work piece clear of the transfer mechanism, the mechanism being automatically returned from work delivering to work receiving position after the work piece has been thus cleared. Preferably also the mechanism includes special features for facilitating the feed of the work pieces by gravity into proper position to be transferred by the mechanism, and properly deposited by the mechanism onto the traveling conveyor. The above and other features of the invention will be in part obvious and in part specifically referred to in the description hereinafter contained which taken in conjunction with the accompanying drawings discloses a preferred form of transfer mechanism constructed to operate in accordance with the invention. The disclosure however should be considered as merely illustrative of the invention in its broader aspects.

In the drawings:

FIG. 1 is a side elevation of a preferred form of transfer mechanism conforming to the invention, shown in work receiving position.

FIG. 2 is a view taken along the line 2—2 of FIG. 1 looking in the direction of the arrows, the mechanism however being shown in work delivering position.

FIG. 3 is a detail section taken on the line 3—3 of FIG. 1 looking in the direction of the arrows.

FIG. 4 is a central vertical section taken through the parts shown in FIG. 3, but showing them in work delivering position.

FIG. 5 is a schematic diagram showing in simplified form circuit arrangements appropriate for use in carrying out the invention.

The invention is disclosed as applied to an installation where stereoplates A are to be successively fed from a machine as indicated schematically at B in FIG. 1, to the transfer mechanism as later described, and thereupon successively transferred to and delivered upon a traveling roller chain conveyor C which may be understood as of known construction and positioned in line with slots D in the flooring E of the installation. The machine B may be understood as being for example an auto-shaver of known construction which performs certain finishing operations upon stereoplates such as are used in newspaper printing, these plates being in general in the form of semicylindrical shells. The auto-shaver is shown as having a delivery chute provided with rollers F as indicated at the left of FIG. 1. A control finger G is also indicated schematically at the left of FIG. 1, and may be understood as periodically lifted from the plate restraining position shown in FIG. 1 so that the stereoplates A are successively fed by gravity at timed intervals from the machine B to the transfer mechanism.

During transfer, the stereoplate is supported and held by a work supporting member 1 the illustrated form of which is somewhat tray-like in shape. Preferably this member 1 as shown in FIG. 1, is somewhat downwardly inclined when in work receiving position, so that the stereoplate to be transferred, when released by the finger G, will be urged by gravity into the fully supported position shown in FIG. 1, wherein the stereoplate A is shown as having traveled along the member 1 into engagement with an elastic bumper 2 on the end wall 3 of member 1. Preferably also the work supporting member 1 is provided with spaced rows of anti-friction rollers 4 positioned to engage the inner arcuate surface of the stereoplate as it travels along the work supporting member and facilitate its passage to the fully supported position shown in FIG. 1. These rows of rollers, related to each other as indicated in FIG. 3, tend to promote a symmetrical and uniformly supported positioning of the stereoplate on the supporting member 1 while held by the latter. As shown the rollers 4 of the central row are mounted upon an angle piece 5 (FIG. 3) secured to the base of the work supporting member 1, and the outer rows of rollers are mounted respectively upon the inclined side walls 6 of such member, the assembly of rollers engaging the work piece A along the three parallel lines of contact which symmetrically bear its weight.

The work supporting member 1 is in turn carried by a frame which moves it between the upper work receiving position shown in FIG. 1 and the work delivering position shown in FIG. 2. In the illustrated form of the invention this frame is constituted by an arm 7 and a shaft 8 which is mounted slidably and rotatably in fixed bearings 9 and 10 which are carried by brackets 11 and 12 secured to upright 13 which supports the transfer mechanism as a whole, the arm 7 being attached to the lower end of the shaft.

To afford the vertical motion needed to move the transfer mechanism between the work receiving position shown in FIG. 1 and the work delivering position shown in FIG. 2, the illustrated form of the invention is provided with a fluid pressure powered cylinder 14 having a piston rod 15, the lower end of which is connected to the shaft 8 by means of a collar 16 which surrounds the shaft and has an arm 17 connected to rod 15. By regulating the fluid-under-pressure supply to cylinder 14 as hereinafter described in more detail, the work supporting member may be raised and lowered as required.

To afford needed angular displacement of the stereoplates A during transfer, the shaft 8 is shown as provided with a spiral groove 18 (FIGS. 1 and 2) in which engages a pin 19 mounted on a bracket 20 fixed to the bracket 12. Thus as the transfer mechanism moves downwardly from the work receiving position shown in FIG. 1 the engagement of pin 19 in groove 18 will cause the work supporting member 1 and the stereoplate A carried thereby to swing angularly about the shaft 8 as an axis until shortly before the mechanism reaches the work delivering position shown in FIG. 2, the opposite bottom edges of the plate A being transferred, will be alined with the slots D of the flooring and with the passes of the roller conveyor C, after which the plate moves down vertically until deposited on the conveyor.

As indicated in FIG. 2, when in work delivering position the shaft 8 preferably is moved down far enough to disengage the rollers 4 from contact with the plate A, the latter being thereupon freely supported by the rollers of the traveling conveyor C, which travels in the direction (to the left as the parts appear in FIG. 2) which moves the delivered stereoplate A laterally to clear the delivered work from the path of movement of the work supporting member 1 when the latter returns from work delivering to work receiving position.

Preferably the work supporting member 1 is so coordinated in the mechanism that in passing from the inclined work receiving position shown in FIG. 1 to the work delivering position shown in FIG. 2, the work supporting member 1 is shifted to an approximately horizontal position in which the plate lies parallel to the conveyor C while moving onto the latter. In the illustrated form of the invention, the work supporting member 1 is hinged as indicated at 21 (FIGS. 1–4) to the laterally extending arm 7, and the weight of the work supporting member 1 is so distributed as to urge member 1 into the inclined position shown in FIG. 1 wherein the plate A rolls by gravity into the fully supported position shown in FIG. 1. In this position a spring finger 22 which is shown as attached to member 1, is idle, but as the work supporting member 1 moves into the work delivering position shown in FIG. 2, this finger 22 engages the flooring E and tilts the member 1 into the horizontal position shown in FIGS. 2 and 4, the end wall 3 of member 1 then engaging a stop 23 (FIG. 2). During the return movement of the work supporting member from work delivering to work receiving position, the finger 22 is released from engagement with the flooring E and the work supporting member thereupon restored to its inclined work receiving position.

Preferably the work supporting member 1 is so coordinated that the movement of a stereoplate A into fully supported position activates the mechanism to initiate the movement of work supporting member 1 from work receiving to work delivering position. In the illustrated form of the invention, the member 1 is provided with an electrical contactor 24 (FIGS. 3 and 4) having a rocker arm 25 carrying a roller 26 positioned to be engaged and rocked by the forward end surface of plate A as the latter moves into fully supported position on member 1. In FIG. 5 this contactor 24 is shown as controlling circuit to an electromagnetic coil 27, the armature 28 of which controls the valve 29 serving the cylinder 14, in such manner that when contactor 24 is closed, fluid under pressure is supplied to the upper end of cylinder 14, and the lower end of the cylinder is vented, the shaft 8 and parts carried thereby being thereupon moved downwardly from the work receiving position shown in FIG. 1 to the work delivering position shown in FIG. 2. As work delivering position is reached, a limit switch 30 having a rocker arm 31 (FIGS. 1 and 5) is engaged by the downwardly moving arm 17 to close a circuit as indicated in FIG. 5 which leads through an electromagnetic coil 32, the armature 33 of which thereupon shifts the valve 29 to the position shown in FIG. 5, wherein fluid under pressure is being supplied to the lower end of cylinder 14 to initiate the return movement of the mechanism from work delivering to work receiving position, and the upper end of the cylinder is vented. However a time relay as indicated schematically at 34 in FIG. 5, is provided to delay the completion of this last mentioned circuit until the conveyor C has had time to clear the delivered stereoplate A away from the return path of movement of the work supporting member 1. The valve 29 holds the position shown in FIG. 5 until after the mechanism has been restored to the work receiving position shown in FIG. 1, and a further stereoplate A has been fed onto the work supporting member 1 so as to activate the contactor 24 and thereby shift valve 29 to thereby cause the mechanism to transfer the newly received stereoplate from work receiving to work delivering position.

While the invention has been disclosed as carried out by apparatus of the above described specific form, it should be understood that changes may be made therein without departing from the invention in its broader aspects, within the scope of the appended claims.

What is claimed is:
1. Transfer mechanism of the character described, including a work supporting member, a frame carrying said work supporting member, means for shifting said frame to move said member between an upper work receiving position and a lower work delivering position which is angularly displaced with respect to the receiving position, said frame including a shaft mounted for upward and downward reciprocatory movement, said shaft having spiral groove means for imparting the above mentioned angular displacement during such movements, and having an arm extending out laterally therefrom, said work supporting member being mounted on said arm and carrying series of rollers positioned to underlie and engage work pieces fed onto said work supporting member, said work supporting member carrying a contactor actuated by movement of the work into fully supported position on said member, means controlled by said contactor for energizing said shifting means to move the work supporting member from work receiving to work delivering position, a traveling conveyor disposed beneath said frame in position to receive the work when said member moves into work delivering position to clear the work from the path of movement of said member, and means activated by movement of said work supporting member into work delivering position for activating said shifting means to return said work supporting member from work delivering to work receiving position after a predetermined time delay.

2. Transfer mechanism of the character described, including a work supporting member, a frame carrying said work supporting member, means for shifting said frame to move said member between an upper work receiving position and a lower work delivering position which is angularly displaced with respect to the receiving position, said frame including a shaft mounted for upward and downward reciprocating movement, said shaft having spiral guide means for imparting the above mentioned angular displacement during such movements, and having an arm extending out laterally therefrom, said work supporting member being pivotally mounted on said arm in normally inclined position and carrying a contactor actuated by movement of the work into fully supported position on said member, means controlled by said contactor for energizing said shifting means to move the work supporting member from work receiving to work delivering position, work receiving means disposed beneath the frame and operable to clear the work from the path of movement of the work supporting member when said supporting member moves into work delivering position, means associated with said work supporting member for pivoting same relatively to said arm from its normal inclined position to substantially horizontal position when said supporting member moves into work delivering position to transfer the work to said work receiving means, and means activated by movement of said work supporting member into work delivering position for actuating said shifting means to return said supporting member from work delivering to work receiving position after a predetermined time delay.

References Cited in the file of this patent
UNITED STATES PATENTS

| | | |
|---|---|---|
| 933,354 | Aab | Sept. 7, 1909 |
| 1,759,506 | Hauk | May 20, 1930 |
| 2,268,075 | Langer | Dec. 30, 1941 |
| 2,394,552 | Kelly | Feb. 12, 1946 |
| 2,790,567 | Rockhill | Apr. 30, 1957 |
| 2,813,643 | Prentice | Nov. 19, 1957 |